Figure 1:
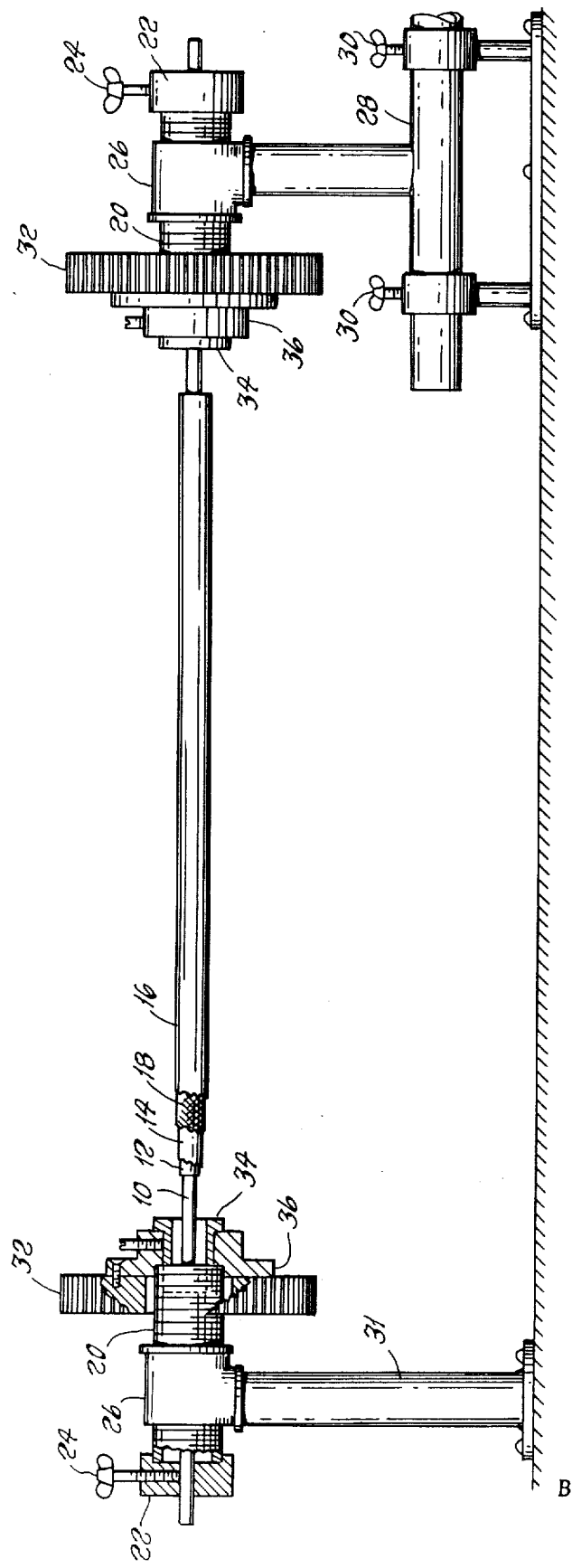

United States Patent
Parker et al.

[11] 3,881,165
[45] Apr. 29, 1975

[54] CABLE MOUNTED MAGNETOSTRICTIVE LINE HYDROPHONE

[75] Inventors: David E. Parker, Pawcatuck, Conn.; Henry G. Smith, Jr., Charleston, S.C.

[73] Assignee: The United States of America as represented by the Secretary of the Navy, Washington, D.C.

[22] Filed: May 6, 1970

[21] Appl. No.: 34,929

[52] U.S. Cl. ................ 340/3 T; 340/11; 340/3 B; 29/594; 156/51
[51] Int. Cl. ............................................... G01v 1/38
[58] Field of Search ............................. 340/11, 3, 7

[56] References Cited
UNITED STATES PATENTS
3,371,311 2/1968 Cholet et al. .................. 340/3 T

*Primary Examiner*—Maynard R. Wilbur
*Assistant Examiner*—N. Moskowitz
*Attorney, Agent, or Firm*—Richard S. Sciascia; Arthur A. McGill; Prithvi C. Lall

[57] ABSTRACT

A flexible magnetostrictive hydrophone assembly carried by a multiconductor cable and including at least one sleeve-like flexible hydrophone unit secured in place along the cable. The sleeve-like hydrophone unit has a flexible tubular support core dimensioned for a sliding fit on the cable. The tubular core is a sandwich constructed for pressure release. The core carries a helically coiled magnetostrictive flexible ribbon and a continuous length flexible conductor arranged toroidally around the ribbon helix. The ends of the toroidal conductor are connected to two conductors of the cable and the combination is hermetically sealed.

5 Claims, 6 Drawing Figures

CABLE MOUNTED MAGNETOSTRICTIVE LINE HYDROPHONE

The invention described herein may be manufactured and used by or for the Government of the United States of America for governmental purposes without the payment of any royalties thereon or therefor.

SUMMARY OF THE INVENTION

Magnetostrictive material in the form of a ribbon coiled into a slightly open helix is surrounded by a toroidally coiled conductor and is carried as a jacket by an electric cable to operate as a line hydrophone. The hydrophone is assembled in relatively short units, any number of which is slid onto the cable. In each hydrophone unit, the magnetostrictive helix and toroidally coiled conductor are supported on a flexible tubular nonmagnetic core with pressure release and having an inside diameter for a sliding fit on the cable. The magnetostrictive ribbon helix flexes readily with the cable. For additional sensitivity, two or more magnetostrictive ribbon helices are coiled over the core. Adjacent helices are coiled in opposing directions. Each half turn stretch of the conductor is longer than the helices and tubular support. The slack is taken out of the half turns of conductor within the magnetostrictive helix and outside the helix by drawing circularly displacing the centers of the stretches relative to the ends around the core in a selected direction. The toroidal conductor ends of each hydrophone unit are electrically connected to a conductor pair of the cable. The cable mounted hydrophone units are hermetically sealed with a flexible envelope. The method of assembly enables the toroidal conductor to be continuous rather than a series of soldered together segments whereby signal attenuation in the conductor is minimal.

Figure 4:
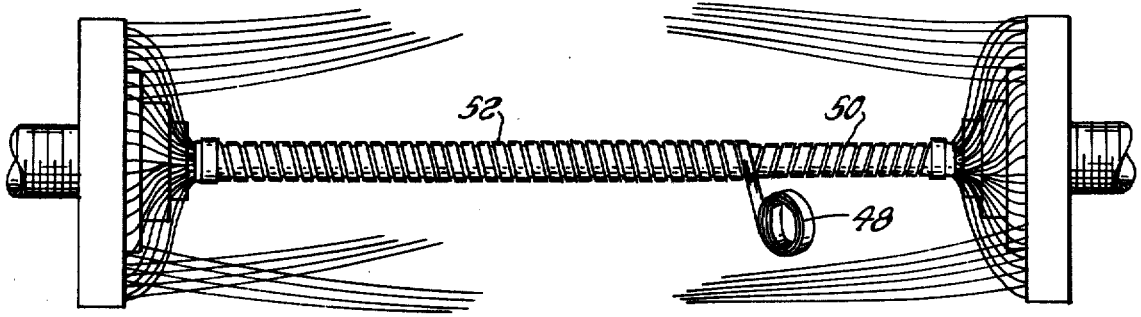
Figure 5:
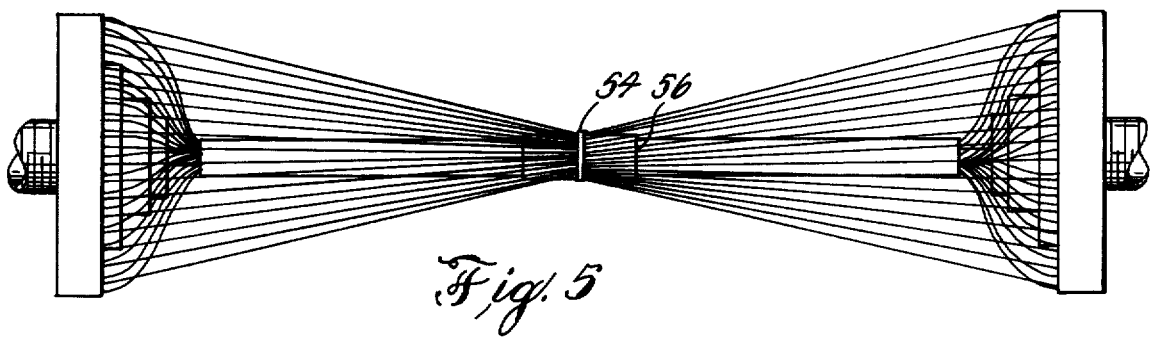
Figure 6:
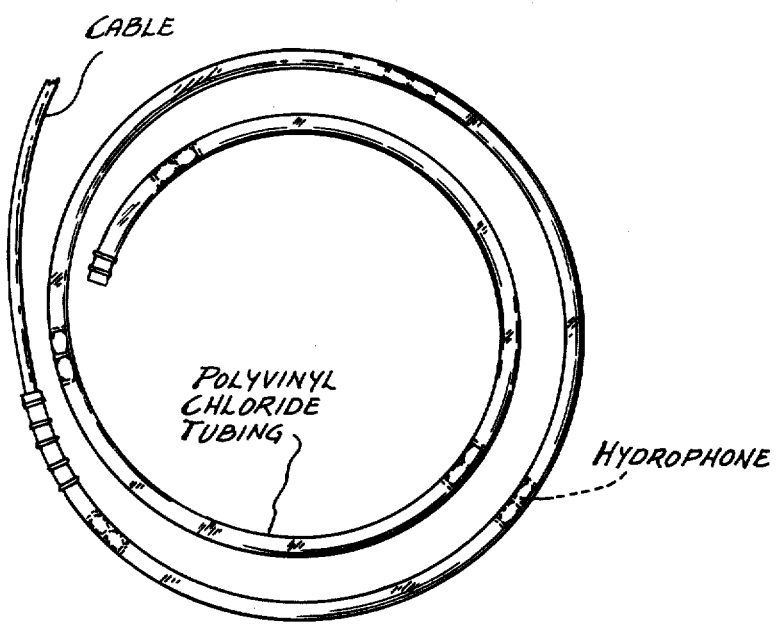

FIGS. 1 to 5 illustrate successive stages of a method of making a hydrophone in accordance with this invention; and FIG. 6 shows an embodiment of the invention.

The starting steps in making a hydrophone in accordance with this invention includes obtaining a rigid rod 10 as shown in FIG. 1 about four to five feet long and 3/16 diameter, then dipping in, painting, or otherwise coating the rod with paraffin 12. Dimensions of the rod and succeeding elements are recited as a guide and are not intended as limiting. A twenty-one inch length of pliable plastic shrink tubing 14 is slid over the paraffin coating, warmed slightly by means of a warm air fan or heat lamp till snug over the paraffin. Shrink tubing is marketed commercially; it is a thermoplastic material which had been deformed while cold and which restores to its dimensions prior to deformation when warmed. The shrink tubing is removable from the rod when the combination is placed in an oven and the temperature raised sufficiently to melt the paraffin. An equal length of ¼ inch pliable plastic tubing 16 e.g., polyvinyl chloride, is slid over an eighteen inch length of braided fiberglass sleeving 18 of the type that is used for protecting wiring. The fiberglass sleeving 18 is centered between the ends of tubing 16. The inside diameter of the tubing and the outside diameter of the sleeving are selected so that that they fit together snugly. The fiberglass sleeving is sandwiched between the tubings to support an air space between the tubings for pressure release.

The ends of the rod 10 are supported in aligned pipe stubs 20 that are externally threaded, and that carry caps 22 on the far ends. The caps are provided with wing screws 24 for clamping the ends of the rod.

Each of the pipe stubs are externally threaded and are supported in pipe fittings 26. At least one of the pipe fittings 26 is carried by a support 28 that is adjustable in a direction parallel to the rod and which is locked in selected position by thumb screws 30. The fitting 26 on the other pipe stub may be carried by another adjustable support such as 28 or may be carried by a fixed position support 30. Identical radially slotted disks 32 having an even number of slots and about six inches in diameter are located on the respective pipe stubs and have bores larger than the pipe stubs. Plugs 34 are seated in the near ends of the pipe stubs. Rings 36 are secured coaxially to the slotted disks and carry set screws for clamping against plugs 34. Either disk may be turned on its axis without changing the span between the disks. The span between disks is adjusted by adjusting pipe support 28.

Figure 2:
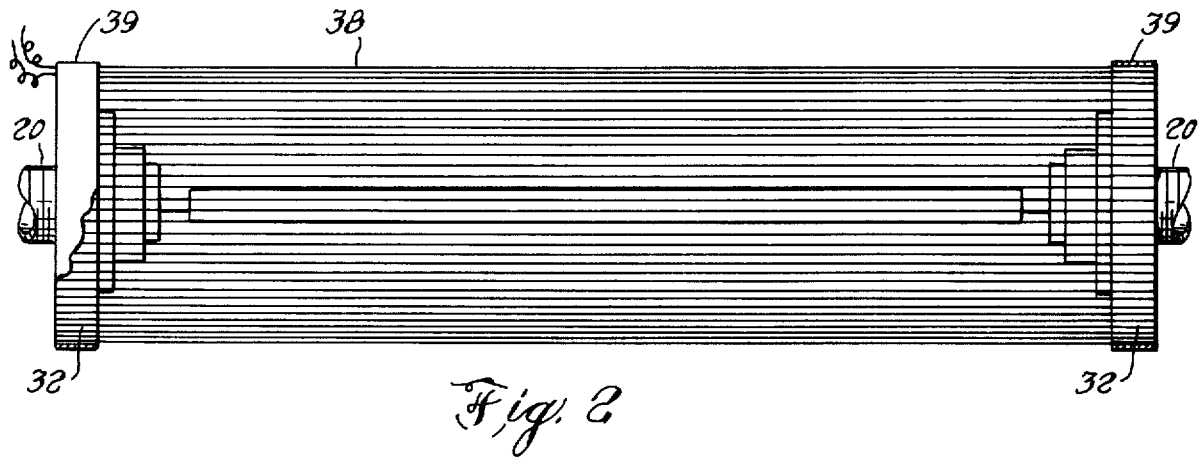
Figure 3A:
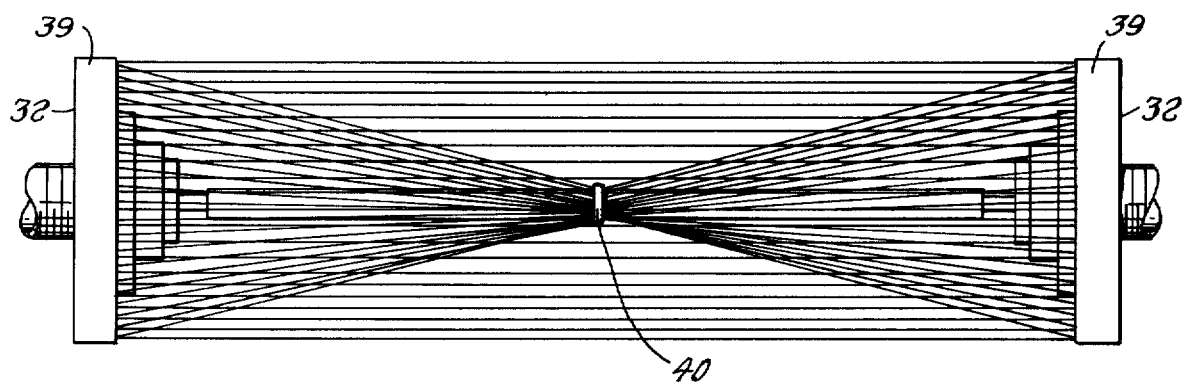
Figure 3B:
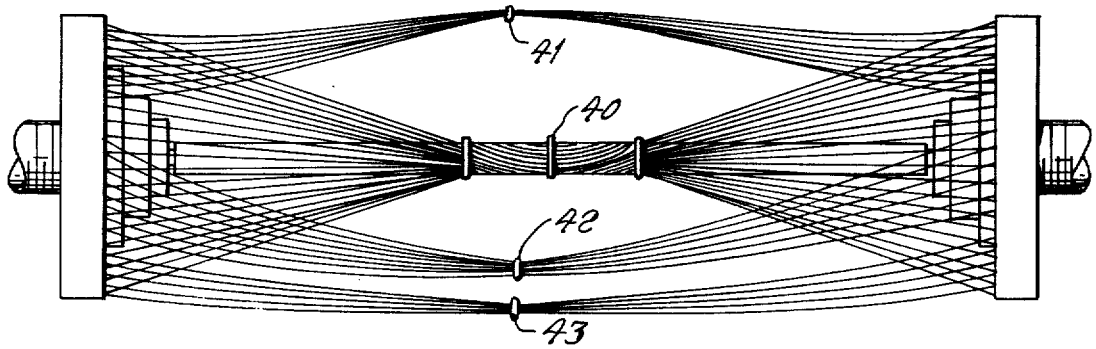
Figure 3C:
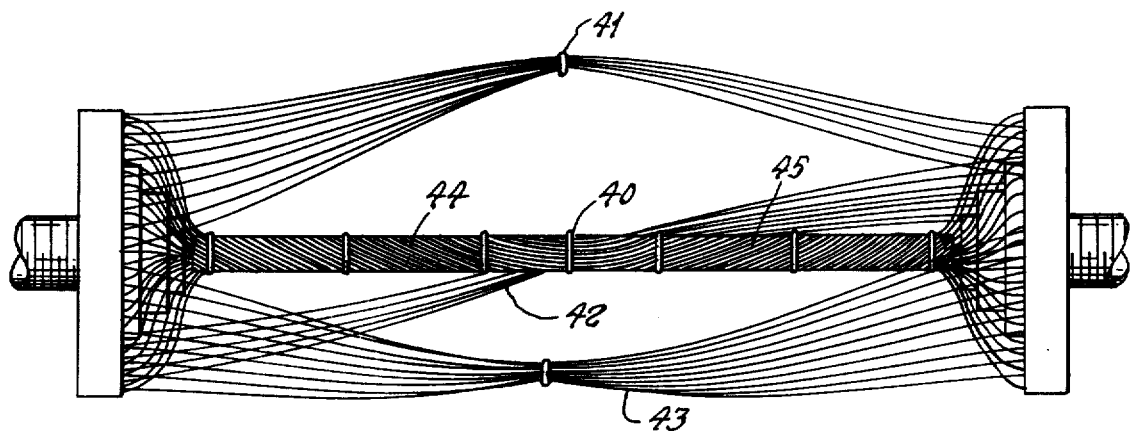

An end of a thin insulated continuous conductor 38 e.g. No. 24 copper wire is fastened in a slot of one disk and the wire is stretched across the span between the disks, through the opposite slot in the other disk, snugged up, bent around an adjacent tooth and threaded through the next slot, and returned across the span to the first disk. The procedure is continued until all slots are filled as shown in FIG. 2. The conductor is thus formed into a circular series of parallel stretches of the conductor with the two free ends of the conductor extending through adjacent slots of the same disk. The perimeters of the notched disks are taped at 39 to keep the ends of the stretches in place in the notches. Then the span is shortened slightly. A short length of twine 40 is laced under and over successive stretches of the conductor so that every second stretch of conductor is within the perimeter of the twine 40 as shown in FIG. 3. The twine is drawn tight. The span is shortened an additional amount. The stretches outside the tied twine are tied into several groups 41, 42, 43, to facilitate the succeeding steps. Then the two disks are turned in the same direction a fraction of a turn to cause the tied stretches to lay on the circumference of the tubing core as similar helices 44, 45 of opposite hand and are tied in place along the core with short lengths of twine. These successive steps are illustrated in the drawings, especially in FIGS. 2, 3a, 3b and 3c.

A roll of nickel ribbon 48, e.g. No. 205 nickel 0.007 inch thick by 5/16 inch wide is snugly coiled helically around the tied stretches of conductor for a distance corresponding to the length of the fiberglass braid, namely 18 inches as shown in FIG. 4. Each turn is slightly spaced from its neighboring turns for enhanced flexibility and minimal deformation during flexure. The ends of the magnetostrictive helix are tied or taped in place. The helix 50 may be overlaid with one or a plurality of additional helices 52. Where there is more than one helical layer of magnetostrictive ribbon, each helix runs oppositely to the adjacent helix or helices. The ends of each additional helix are tied in place.

Then the groups of tied stretches 41, 42, 43 are untied, the disks are turned back to where the untied stretches are parallel to the axis, and the span is increased to reduce the slack. All the outer stretches are gathered centrally against the core as shown in FIG. 5 and tied with a piece of twine 54. A segment of low friction plastic film 56 is included between the external surface of the magnetostrictive material and the outer stretches of the conductor. Then the assembly is grasped at the tie and the outer stretches twisted as the span between the disks is gradually reduced so that the outer stretches are coiled around the magnetostrictive material as two helices of opposite hand similar to those stretches within the magnetostrictive helices. The outer stretches are secured with a helically coiled serving of nylon monofilament, not shown. The ends of the conductor coils are released from the disks, the rod carrying the hydrophone is separated from the disks and placed in an oven, the temperature is elevated to about 150°F to melt the paraffin. With the paraffin melted the assembly is slid off the rod. One or a plurality of these assemblies are slid onto a cable having an outside diameter slightly less than the inside diameter of the core. Adjacent the conductor ends of the toroidal winding of each assembly, a conductor pair is separated out of the cable and electrically joined to the ends of the hydrophone unit (The phrase "toroidal winding" expresses the fact that the winding becomes a toroidal winding when a toroid is formed — when the nickel strip is positioned as a helix external to and over the conductor parts adjacent to the core.). The flexible tubing ends of the core are bound tightly against the cable so as to hold the unit in place on the cable and to hermetically seal in the pressure release air space that is supported against collapse by the braided fiberglass sleeve. The loops at the ends of the hydrophone unit are gathered and tied around the cable. The hydrophone units described wherein the core is twenty-one inches long are assembled on the cable approximately twenty-five inches apart on centers. The cable carrying the hydrophone units is potted in flexible acoustically-transparent resin as in FIG. 6. Alternatively the assembly is slipped into a suitable length of ¾ inch polyvinyl chloride tubing that is long enough to enclose the assembly and extend beyond the end of the assembly and cable; the tubing is tied tightly at one end against the cable to form a fluid seal thereagainst, then is filled with castor oil, plugged and sealed at the other end.

Assembly of hydrophone units on the cable can be carried out in the field to meet stowage or shipping requirements.

We claim:

1. A flexible magnetostrictive line hydrophone comprising
    a flexible electric cable having a watertight jacket and including at least two insulated conductors,
    a flexible helix of magnetostrictive ribbon around a length of the cable,
    a toroidal winding of a length of a continuous thin flexible conductor around the helix of magnetic ribbon,
    the ends of the conductor forming the toroidal winding being electrically connected to the two insulated conductors of the cable.

2. A flexible magnetostrictive line hydrophone as defined in claim 1 wherein each half turn of the toroidally wound continuous conductor is substantially longer than the axial length of the helix, terminating at points that lie along a line approximately parallel to the axis of the cable and wherein the length between the ends is layed on in one direction around the axis of the cable to define two helices of opposite hand from the center of the half turn out to the ends of the half turn.

3. A flexible magnetostrictive line hydrophone as defined in claim 2 further comprising
    a length of flexible tubing supporting said helix of magnetic ribbon and toroidal winding exterior thereto and being mounted as a sleeve on said cable.

4. A flexible magnetostrictive line hydrophone is defined in claim 3 further comprising
    a second length of flexible tubing inside and coextensive with the first length of flexible tubing, and tubular woven fiberglass sandwiched between the lengths of flexible tubing and that terminates inward of both ends of the tubings,
    the ends of the magnetostrictive helix and toroidal conductor being spaced from the ends of the tubings,
    the ends of the tubings being clamped together and to the cable beyond the ends of the fiberglass to seal in the fiberglass, and
    acoustically transparent flexible means enveloping the magnetostrictive helix and toroidal conductor.

5. A flexible magnetostrictive line hydrophone as defined in claim 4 wherein
    said magnetostrictive helix is a slightly open helix,
    said hydrophone further including at least one additional helix overlaying and coextensive with the first-mentioned magnetostrictive helix, and
    wherein the contiguous helices are of opposite hand.

* * * * *